United States Patent
Yokoi (10) Patent No.: US 11,061,004 B2
(45) Date of Patent: Jul. 13, 2021

(54) MODULAR-TYPE ANALYSIS SYSTEM

(71) Applicant: Shimadzu Corporation, Kyoto (JP)

(72) Inventor: Yusuke Yokoi, Kyoto (JP)

(73) Assignee: Shimadzu Corporation, Kyoto (JP)

(*) Notice: Subject to any disclaimer, the term of this patent is extended or adjusted under 35 U.S.C. 154(b) by 65 days.

(21) Appl. No.: 15/556,151

(22) PCT Filed: Apr. 3, 2015

(86) PCT No.: PCT/JP2015/060584
§ 371 (c)(1),
(2) Date: Nov. 8, 2017

(87) PCT Pub. No.: WO2016/157516
PCT Pub. Date: Oct. 6, 2016

(65) Prior Publication Data
US 2018/0052140 A1 Feb. 22, 2018

(51) Int. Cl.
*G01N 30/24* (2006.01)
*G01N 30/02* (2006.01)
(Continued)

(52) U.S. Cl.
CPC .............. *G01N 30/24* (2013.01); *G01N 30/02* (2013.01); *G01N 30/86* (2013.01); *G01N 35/00* (2013.01);
(Continued)

(58) Field of Classification Search
CPC . G01N 2030/8881; G01N 2035/00178; G01N 2035/00326; G01N 2035/00306;
(Continued)

(56) References Cited

U.S. PATENT DOCUMENTS

| 4,424,559 A * | 1/1984 | Lorincz | C12M 41/48 422/62 |
| 2004/0144159 A1* | 7/2004 | Stewart | G01N 30/88 73/23.36 |

(Continued)

FOREIGN PATENT DOCUMENTS

| CN | 102928541 A | 2/2013 |
| CN | 103889553 A | 6/2014 |

(Continued)

OTHER PUBLICATIONS

Extended European Search Report dated Feb. 9, 2018 for the corresponding European Patent Application No. 15887662.3.

(Continued)

*Primary Examiner* — Nam X Nguyen
*Assistant Examiner* — Ekandra S. Miller-Cruz
(74) *Attorney, Agent, or Firm* — Muir Patent Law, PLLC (57) ABSTRACT

A system and method in which, upon receipt of an analysis initiation instruction and regardless of the necessity of any changes in operation at the time of the analysis initiation, an integrated controller of a system control unit notifies other units of analysis initiation and changes the luminescent color of a state indication LED to blue, which is common to each unit. In a liquid supply unit that receives a notification of the analysis initiation, a local controller changes the device status to "RUN" and changes the luminescent color of a state indication LED to blue. This is also applies to other units. Upon completion of the analysis, the integrated controller notifies each unit of the analysis completion and changes the display color of the state indication LED to green. Each unit also changes the display color of the state indication LED to green.

3 Claims, 5 Drawing Sheets (51) Int. Cl.
*G01N 35/00* (2006.01)
*G01N 30/30* (2006.01)
*G01N 30/88* (2006.01)
*G01N 30/86* (2006.01)
*G01N 30/16* (2006.01)

(52) U.S. Cl.
CPC ....... *G01N 35/00871* (2013.01); *G01N 30/16* (2013.01); *G01N 30/30* (2013.01); *G01N 30/88* (2013.01); *G01N 2030/027* (2013.01); *G01N 2035/00326* (2013.01); *G01N 2035/00891* (2013.01)

(58) Field of Classification Search
CPC ......... G01N 35/00594; G01N 30/6039; G01N 30/6026; G01N 30/22; G01N 35/00; G01N 30/8658; G01N 2030/522; G01N 35/00584; G01N 35/00603; G01N 35/00613; G01N 35/00623; G01N 35/00693; G01N 35/00712; G01N 35/00871; G01N 2201/021; G01N 2201/024; G01N 2201/0245; G01N 2201/12; G01N 2201/126; G01N 2035/00633; G01N 2035/00643; G01N 2035/00653; G01N 2035/00702; G01N 2035/00851; G01N 2035/00881; G01N 2035/00891; G01N 2035/009; G01N 2035/0094; G01N 2035/0091; B01D 15/22; B01D 15/08; B01D 15/10; B01L 2200/02; B01L 2200/028; B01L 2200/14; B01L 2200/143; B01L 2200/148; B01L 2300/02; B01L 2300/024; B01L 2300/046
USPC ......... 210/143, 198.2, 635, 656; 422/70, 89; 436/161; 73/19.02, 23.22, 23.35, 23.36, 73/61.52; 95/82; 96/101, 102; 362/23.07, 23.08, 612
See application file for complete search history.

(56) References Cited

U.S. PATENT DOCUMENTS

| | | | | |
|---|---|---|---|---|
| 2004/0158433 | A1* | 8/2004 | Wimschneider | G01N 30/88 702/183 |
| 2007/0268682 | A1* | 11/2007 | Kim | F25D 27/005 362/92 |
| 2009/0223369 | A1* | 9/2009 | Uegaki | F27D 21/0028 96/102 |
| 2011/0147312 | A1* | 6/2011 | Cunnien | G01N 30/34 210/656 |
| 2013/0206653 | A1* | 8/2013 | Brann | G01N 30/30 210/85 |
| 2013/0218352 | A1* | 8/2013 | Iovanni | G05D 7/0617 700/282 |

FOREIGN PATENT DOCUMENTS

| | | | | |
|---|---|---|---|---|
| JP | 2010-H22195 | * | 6/2010 | G01N 30/54 |
| JP | 4903485 B2 | * | 5/2012 | F25D 23/00 |
| WO | 2013028828 A1 | | 2/2013 | |

OTHER PUBLICATIONS

"Liquid chromatograph (HPLC)", [online], Shimadzu Corporation, [Searched on Mar. 20, 2015, obtained Aug. 31, 2017], Internet <URL:http://www.an.shimadzu.co. Jp/hplc/hplc.htm>.
Written Opinion for PCT Application PCT/JP2015/060584 dated Jun. 30, 2015.
International Search Report for PCT Application PCT/JP2015/060584 dated Jun. 30, 2015.
First Office Action, dated May 17, 2019, from the State Intellectual Property Office of People's Republic of China, in counterpart foreign Application No. 201580078585.1, including English-language machine translation of the same (16 pages).

* cited by examiner

| LED display color | Status |
|---|---|
| Blue | RUN |
| Green | Ready |
| Yellow | Not Ready |
| Red | Error |
| Orange | Sleep |

FIG. 4

| State →<br>↓ Event | Standby | In progress | Error | Sleep |
|---|---|---|---|---|
| Occurrence of NotReady | → Yellow | → Yellow | nil (Red) | nil (Orange) |
| Release of NotReady | → Green | → Blue | nil (Red) | nil (Orange) |
| Analysis initiation | → Blue | n/a | nil (Red) | nil (Orange) |
| Analysis completion | n/a | → Green or Yellow | nil (Red) | nil (Orange) |
| Occurrence of Error | → Red | → Red | → Red | nil (Orange) |
| Sleep | → Orange | → Orange | → Orange | → Orange |

FIG. 5

System control unit

FIG. 6A

Each unit other than System control unit

FIG. 6B

MODULAR-TYPE ANALYSIS SYSTEM

TECHNICAL FIELD

The present invention relates to a modular-type analysis system capable of executing a predetermined analysis by combining a plurality of units having different functions.

BACKGROUND ART

In analytical instruments, in addition to an integrated-type device in which functions necessary for analysis are incorporated in one housing, there also exists a modular-type device which configures a system by combining a plurality of units having different functions. For example, in the liquid chromatograph disclosed in Non-Patent Document 1, a unit having various functions, such as a liquid supply unit, an autosampler (auto-injector) unit, a column oven unit, a detector unit by various detection methods, and a fraction collector unit, or a unit in which basic functions are the same but additional functions are different are provided. Further, a system controller unit for comprehensively controlling each unit is also provided. By suitably combining these units depending on the purpose, a user can construct a liquid chromatograph (LC) system with a good cost performance that can perform appropriate measurement without adding unnecessary functions.

The liquid supply pump for analysis disclosed in Patent Document 1 is an example of a liquid supply unit used in the above-described modular-type LC system, but a light emitter is provided on the front face of the housing of the unit separately from an indicator. The indicator is intended to notify the user of various information with numbers and letters. On the other hand, the light emitter is intended to notify the user of the internal state (hereinafter referred to as "device status") such as the operation of the unit due to the difference in the luminescent color in an easy-to-understand manner, a similar light emitter is provided at almost the same position on the front face of the housing not only in the liquid supply unit but also in other units.

Since the function of each unit for configuring the LC system is different, the device status that notifies with the luminescent color of the light emitter differs depending on the unit. For example, in a column oven unit, as a main device status, there are a temperature adjusting state (state in which a temperature is unstable), a temperature stable state (state in which analysis can be performed), etc., they are informed to the user with different luminescent colors. In an auto-sampler unit, as main device status, there are a sample injection standby state, a sample injection executing state, etc., which are informed to the user with different luminescent colors. Therefore, the user can grasp the operation state of each unit at a glance by the luminescent color of the light emitter.

However, the above-described LC system has the following problem. That is, as described above, each of the units constituting the LC system informs the device status in each unit by the luminescent color of the light emitter. However, the device status of each unit does not necessarily correspond to the analysis executing state and the standby state (before analysis initiation/after analysis completion). For example, in the liquid supply unit, when the liquid supply pump is driven and shifts from the liquid supply unstable state to the stable state, that is, from the state in which an appropriate analysis cannot be performed to the state in which an appropriate analysis can be performed, the luminescent color of the light emitter changes. However, the change does not mean that the analysis was actually initiated. This also applies to other units. Therefore, even if a user looks at the light emitters of multiple units configuring the LC system, it is difficult for the user to intuitively grasp whether or not the system is executing an analysis. Similarly, it is also difficult to intuitively grasp whether or not the analysis has been completed.

In each unit, it is always checked whether or not the operation to be executed in each unit is being appropriately performed, that is, whether or not the operation is being performed according to the requested performance. When an event that adversely affects the analysis result occurs, the display color of the light emitter of that unit changes to a predetermined color. For example, when the temperature in the column oven suddenly changes, the analysis result is adversely affected. Therefore, when such an event is detected in the column oven unit, the display color of the light emitter of the unit changes to a predetermined color. However, as described above, conventionally, the luminescent color of the light emitter does not always indicate that an analysis is in progress. Therefore, even if the event as described above occurs in a certain unit during the analysis and the luminescent color of the light emitter changes, it was not noticeable and in some cases, the user did not notice it.

PRIOR ART

Patent Document

Patent Document 1: Japanese Design Registration No. 1208225

Non-Patent Document

[Non-patent document 1] "Liquid chromatograph (HPLC)", [online], Shimadzu Corporation, [Searched on Mar. 20, 2015], Internet <URL: http://www.an.shimadzu.co.Jp/hplc/hplc.htm>

SUMMARY OF THE INVENTION

Problems to be Solved by the Invention

The present invention was made in view of the above-described problems, and its main object is to provide a modular-type analysis system that allows a user to intuitively grasp that an analysis is in progress or an analysis has been completed.

Another object of the present invention is to provide a modular-type analysis system capable of easily grasping an occurrence of an event that may affect an analysis result at a certain unit during analysis execution.

Means for Solving the Problems

According to a first aspect of the present invention made to solve the above-described problem, a modular-type analysis system configuring a system for performing an analysis by combining a plurality of units each having an independent housing, the plurality of units including a system control unit, the modular-type analysis system includes:
a) a light emitter capable of emitting multicolor lights provided in a housing of each of the plurality of units;
b) an integrated controller provided in the system control unit and configured to control an operation of each unit to execute the analysis, the integrated controller being configured to notify other each unit of analysis initiation and analysis completion, make a light emitter provided in the system control unit emit light with a predetermined common luminescent color upon the analysis initiation, and change the light to a luminescent color different from the common luminescent color upon the analysis completion, and c) a local controller provided in each unit other than the system control unit, the local controller being configured to make a light emitter provided in its unit emit light with the common luminescent color upon receipt of a notification of the analysis initiation from the integrated controller as long as an operation state of its unit is normal, and change the light to a luminescent color different from the common luminescent color upon receipt of a notification of the analysis completion from the integrated controller.

According to a second aspect of the present invention made to solve the above-mentioned problems, a modular-type analysis system configuring a system for performing an analysis by combining a plurality of units each having an independent housing, the modular-type analysis system includes:

a) a light emitter capable of emitting multicolor lights provided in a housing of each of the plurality of units;

b) an integrated controller provided in any one of the plurality of units and configured to control an operation of each unit to execute the analysis, the integrated controller being configured to notify each unit of analysis initiation and analysis completion; and c) a local controller provided in each of the plurality of units, the local controller being configured to make a light emitter provided in its unit emit light with the a common luminescent color upon receipt of a notification of the analysis initiation from the integrated controller as long as an operation state of its unit is normal, and change the light to a luminescent color different from the common luminescent color upon receipt of a notification of the analysis completion from the integrated controller.

In the modular-type analysis system according to the present invention, although there is such a difference that in the first aspect of the present invention the integrated controller is one independent unit and in the second aspect of the present invention the integrated controller is built in another unit. However, the basic configuration and the operation are the same.

In the modular-type analysis system according to the present invention, an integrated controller that controls the operation of each unit notifies each unit of the analysis initiation at the time of initiation of the analysis based on a user instruction, etc., and notifies each unit of the analysis completion at the time of completion of the analysis. These notifications are also made for units that do not change their operations before and after initiation of the analysis or before and after completion of the analysis. In all units, upon receipt of a notification of the analysis initiation, the local controller makes the light emitter installed in its unit emit light with a common luminescent color. In the first aspect of the present invention, the integrated controller issues a notification of analysis initiation and makes the light emitter provided in its unit (system control unit) emit light with a common luminescent color. As a result, when the analysis is initiated, the light emitters provided in the housings of all the units constituting the system emit light with the same luminescent color. As a result, the user can immediately know that the analysis is initiated by the unified changes of the luminescent colors of the light emitters.

On the other hand, in all units, upon receipt of a notification of analysis initiation, the local controller makes the light emitter installed in its unit emit light with another common luminescent color. In the first aspect of the present invention, the integrated controller issues a notification of analysis completion and makes the light emitter provided in its unit (system control unit) emit light with a common luminescent color in the same manner. As a result, when the analysis is completed, the light emitters installed in the housings of all the units constituting the system change to the same luminescent color. As a result, the user can immediately know that the analysis is completed by the unified changes of the luminescent colors of the light emitters.

In the modular-type analysis system according to the present invention, it is preferably configured such that the local controller provided in each of the plurality of units makes, when an operation state of its unit is abnormal, the light emitter provided in its unit emit light with a predetermined luminescent color regardless of a notification of the analysis initiation or the analysis completion from the integrated controller. This predetermined luminescent color is set to a color different from both the luminescent color after the analysis initiation and the luminescent color after the analysis completion in cases where the operation state of the unit is normal.

According to this configuration, for example, when there occurred an event causing an adverse effect on the analysis result in a certain unit during the analysis, the color of only the light emitter of the unit changes to a color different from another unified luminescent color. Therefore, the user can easily grasp the change.

The modular-type analysis system according to the present invention is not particularly restricted in the analysis method and the measurement method, but as a typical embodiment, it can be applied to a liquid chromatograph analysis system. That is, the modular-type analysis system according to the present invention may be a liquid chromatograph including at least a liquid supply unit for supplying a mobile phase, an injector unit for injecting a sample solution into a supplied mobile phase, a column oven unit for controlling a temperature of a column for separating components in the sample solution, and a detector unit for detecting components in an eluate eluted from the column.

In the liquid chromatograph, for example, the liquid supply unit has a function to supply a mobile phase at a constant flow rate before the analysis initiation, and the column oven unit has a function of controlling a temperature so that the temperature is stably maintained at a predetermined temperature from before the analysis initiation, in both cases, the operation is not changed at the time of the analysis initiation. Therefore, in a conventional system, the luminescent color of the light emitter did not change at the time of initiation of the analysis. However, according to the modular-type analysis system of the present invention, the luminescent color of the light emitter changes to a luminescent color common to other units at the time of initiation of the analysis. Therefore, it becomes more clear that the analysis is in progress.

Effects of the Invention

According to the modular-type analysis system of the present invention, it becomes possible for the user to intuitively grasp whether or not the analysis is in progress, and also becomes possible for the user to intuitively grasp that the analysis is completed. Therefore, the operability is improved, which in turn can improve the efficiency of the analysis operation. In addition, since the light emitters emit lights in a uniform color in all units during the analysis, the visual sense of unity of the system can be improved and the designability can be enhanced.

In addition, in cases where the operation state of the unit is abnormal, by configuring such that a light emitter provided in the unit emits light with a predetermined luminescent color, the use can quickly grasp the unit that became abnormal.

EMBODIMENTS FOR CARRYING OUT THE INVENTION

Hereinafter, an LC system which is one embodiment of a modular-type analysis system according to the present invention will be described in detail with reference to the attached drawings.

Figure 1:
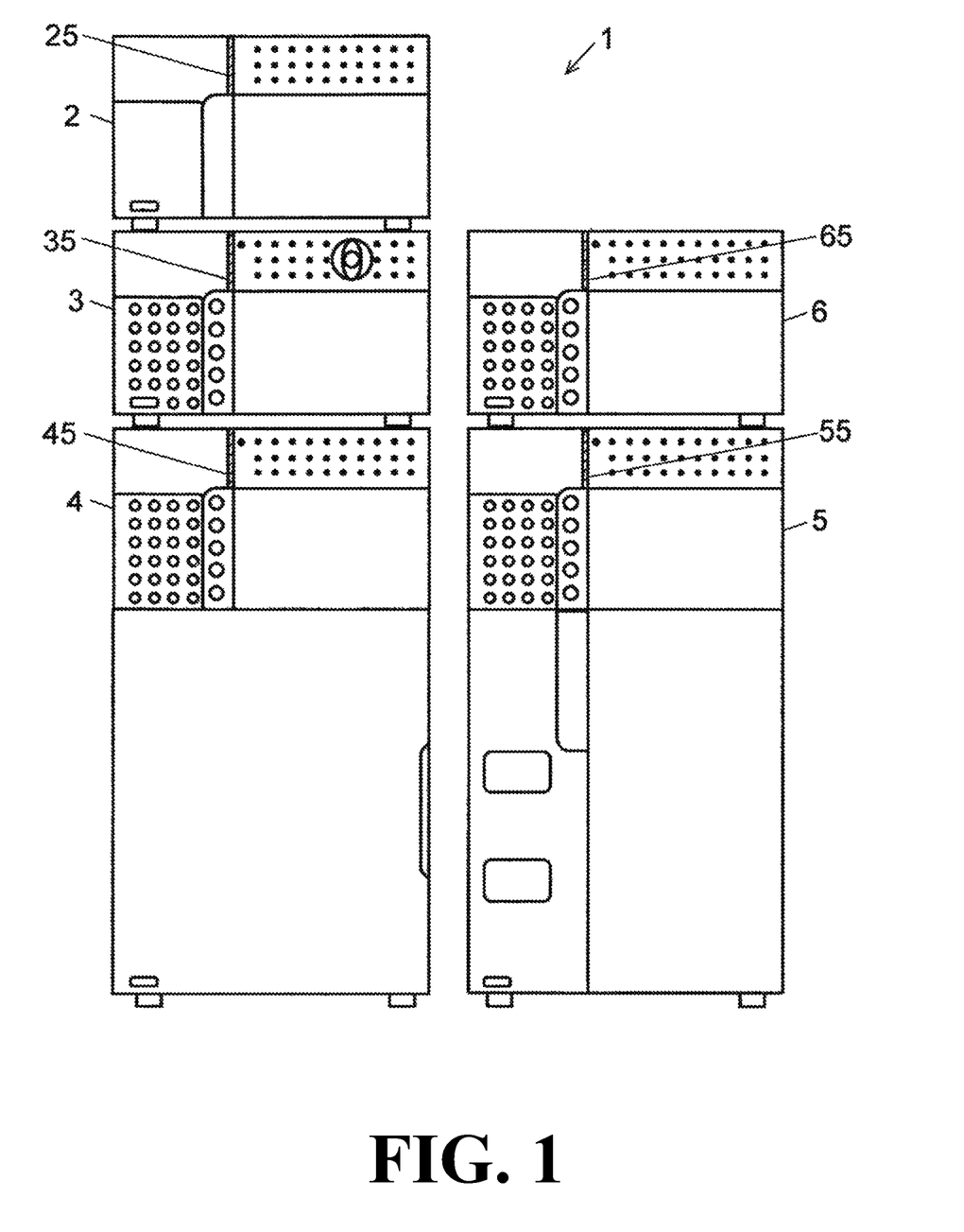
FIG. 1 is an external view of a main part of a liquid chromatograph (LC) system according to an embodiment of the present invention.
Figure 2:
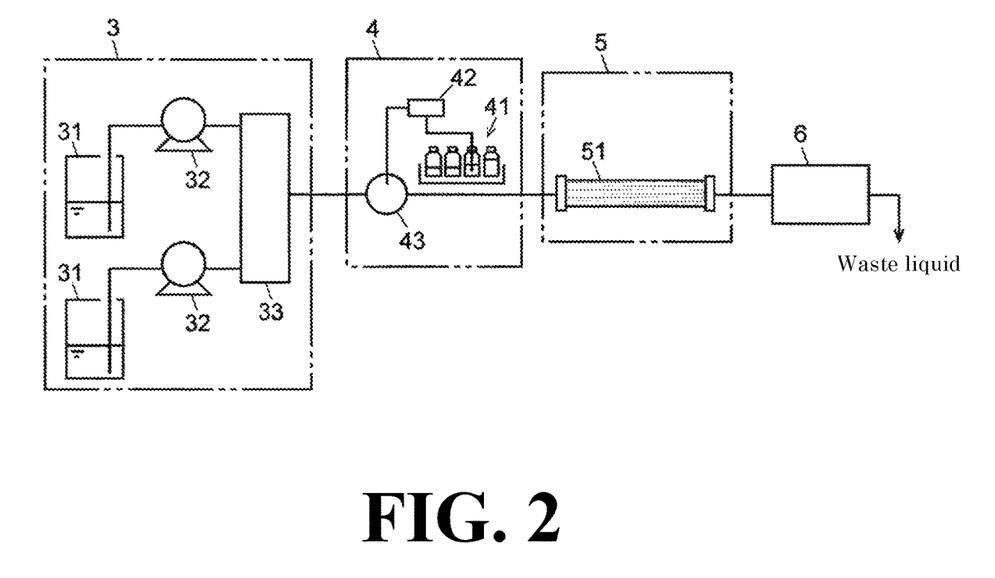
FIG. 2 is a flow path configuration diagram of the LC system of this embodiment.
Figure 3:
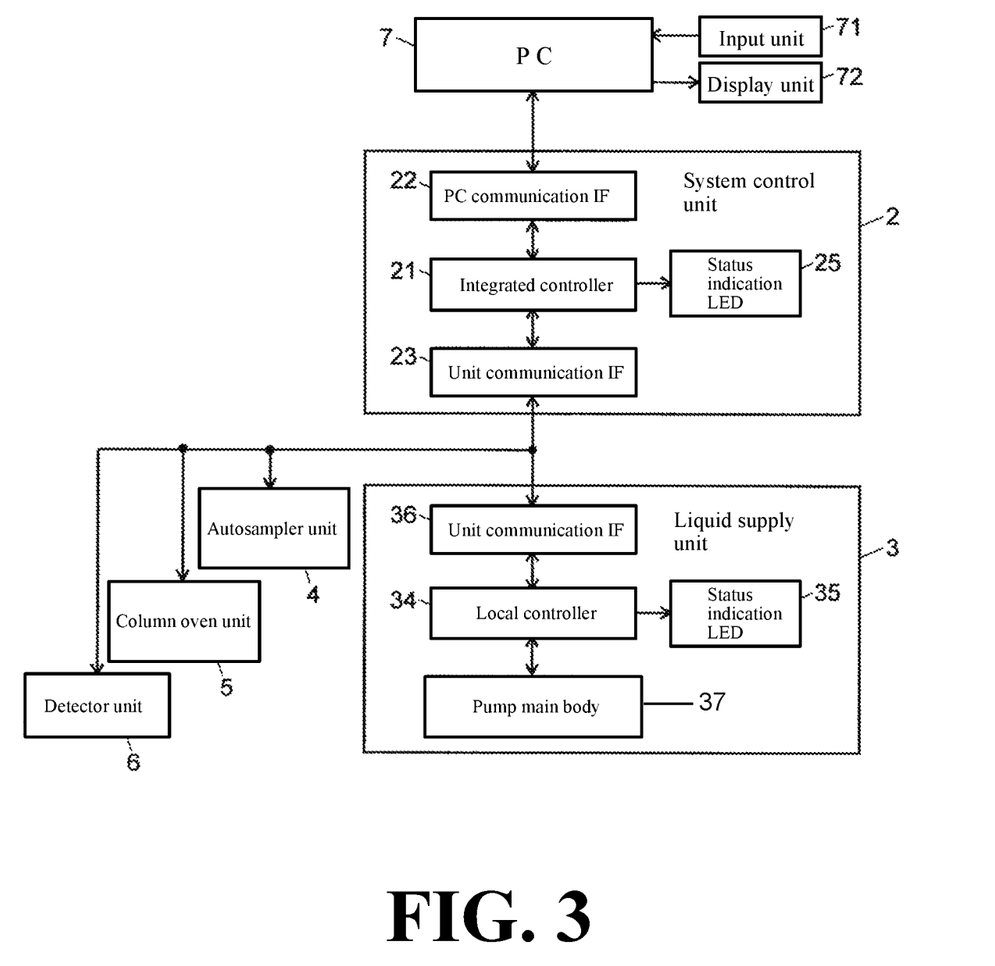
FIG. 3 is a block configuration diagram of a control system of the LC system of this embodiment.

FIG. 1 is an external front view of an analysis main body of the LC system of this embodiment, FIG. 2 is a flow path configuration diagram of the LC system of this embodiment, and FIG. 3 is a block configuration diagram of a control system of the LC system of this embodiment.

The LC system of this embodiment includes an analysis main body 1 composed of a liquid supply unit 3, an autosampler unit 4, a column oven unit 5, a detector unit 6, and a system control unit 2, and a personal computer (PC) 7 for controlling the analysis main body 1 and processing data obtained in the analysis main body 1.

As shown in FIG. 2, the liquid supply unit 3 is equipped with a mobile phase container 31 in which a mobile phase is accommodated, a liquid supply pump 32 for sucking and supplying the mobile phase from the mobile phase container 31, and a gradient mixer 33 for mixing a plurality of mobile phases. It may be configured such that the liquid supply unit has more mobile phase containers 31 and more liquid supply pumps 32, or the liquid supply unit has one mobile phase container and one liquid supply pumps and has no gradient mixer.

The autosampler unit 4 is equipped with a sample plate 41 in which a plurality of vials each containing a sample solution is accommodated, a suction part 42 for sucking a certain amount of the sample solution from a selected one vial, and an injector 43 for injecting the sample solution sucked by the suction part 42 into a mobile phase. The column oven unit 5 includes a heater unit (not shown), etc., and can control the temperature of a column 51 loaded therein.

The detector unit 6 includes a detector of any one of methods, such as, e.g., a photodiode array detector, a UV-visible absorption detector, a spectral fluorescence detector, and a differential refractive index detector.

As shown in FIG. 1, the system control unit 2, the liquid supply unit 3, the autosampler unit 4, the column oven unit 5, and the detector unit 6 are units each having an independent housing. However, the widths of these housings and the designs of the fronts of the housings are unified, so that a visual sense of unity is ensured.

As shown in FIG. 3, an input unit 71 which is a keyboard or a pointing device, and a display unit 72 which is a monitor are connected to the PC 7. Software dedicated to the control and processing of the LC is installed in the PC 7, and by executing the software on the PC, it is configured to control the analysis operation based on the settings of the analysis parameters and its parameters, and execute the arithmetic processing, etc., with respect to the data collected by the analysis main body 1.

The system control unit 2 includes, in addition to the integrated controller 21 which sends a control signal to each of the units 3 to 6, a PC communication interface (IF) 22 for mutual communication with the PC 7, and a unit communication interface (IF) 23 for mutual communication with each of the other units 3 to 6. In addition to a display (not shown) for performing various displays, a state indication LED 25 is connected to the integrated controller 21. The liquid supply unit 3 includes, in addition to a local controller 34 for operating a pump main body 37 such as a plunger pump and a gradient mixer, a unit communication interface (IF) 36 for communicating with the system control unit 2. In addition to a display (not shown) for performing various displays, a state indication LED 35 is connected to the local controller 34.

Although not shown in FIG. 3, like the liquid supply unit 3, the autosampler unit 4, the column oven unit 5, and the detector unit 6 are equipped with a local controller and a unit communication interface, and a state indication LED is connected to the local controller.

Figure 4:
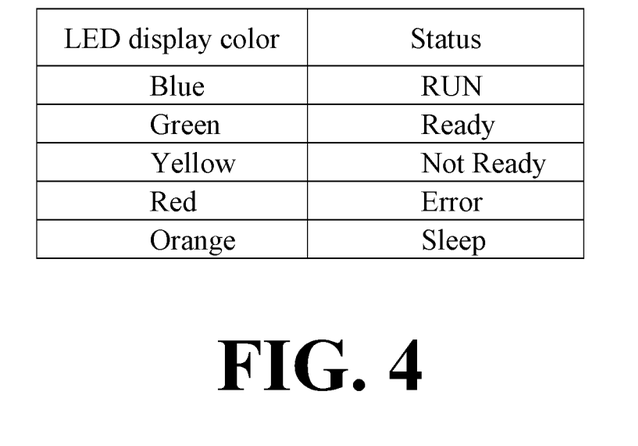
FIG. 4 is a diagram showing a relationship between a display color of a state indication LED of each unit and a device status of the unit in each LC system of this embodiment.

Each state indication LED 25, 35, 45, 55, 65 provided in each unit 2 to 6 is provided at the upper part of the housing front face. Each of the state indication LEDs 25, 35, 45, 55, 65 is a multicolor light emitting LED capable of emitting lights of five colors of blue, green, yellow, red, and orange, and the luminescent color shows the inside state of each unit 2 to 6, i.e., the device status. FIG. 4 is a diagram showing the relationship between the display color of the state indication LED of each unit 2 to 6 and the device status.

Basically, the device status of each unit 2 to 6 represented by the luminescent color of the five state indication LEDs 25 to 65 is common, and as shown in FIG. 4, blue denotes "RUN", that is, a state in which analysis is in progress, green denotes "Ready", that is, a state in which analysis preparation is ready, yellow denotes "NotReady", that is, a state in which analysis preparation is not ready, red denotes "Error", that is, a state in which an abnormality occurred, and orange denotes "Sleep", that is, a state in which analysis is dormant.

Figure 5:
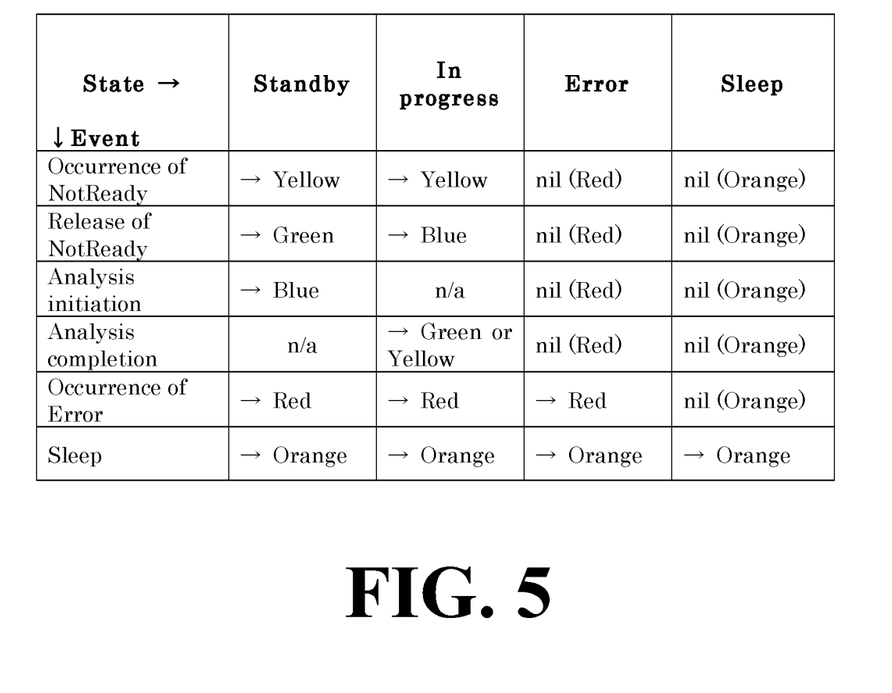
FIG. 5 is a diagram showing a transition of a display color due to a notification from the system control unit or a change in an internal state when a unit is in a certain state in the LC system of this embodiment.
Figure 6A:
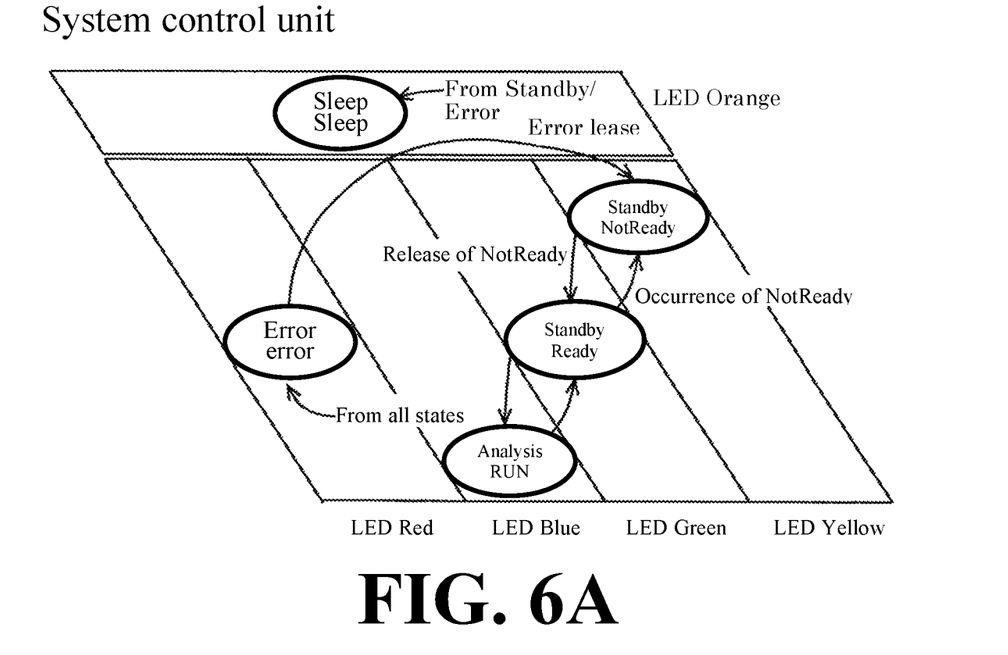
FIG. 6 is a schematic diagram showing transitions of display colors shown in FIG. 5.
Figure 6B:
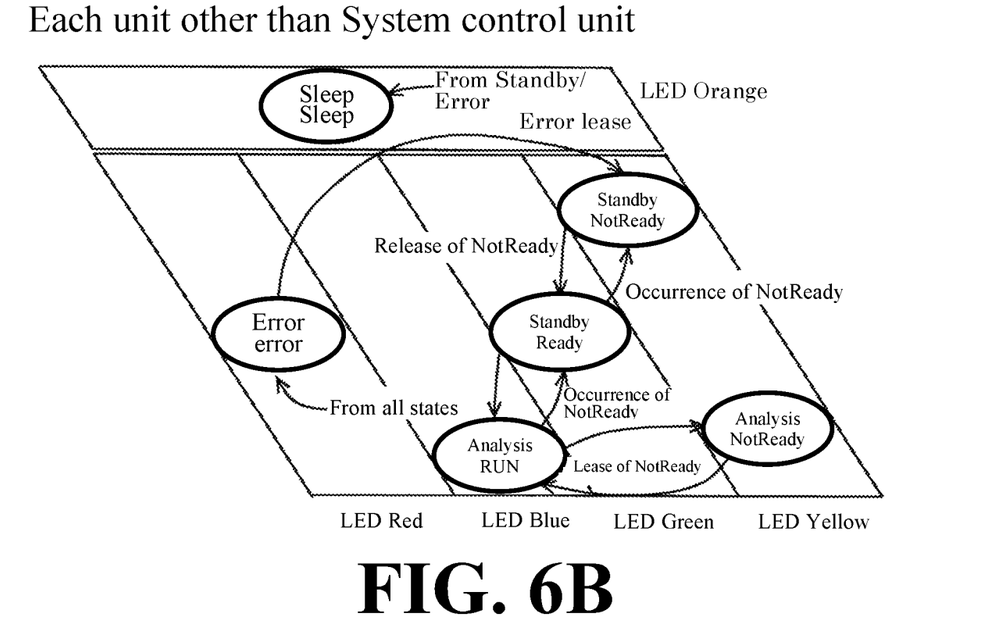

In the LC system of this embodiment, it is characterized by the control operation for making the state indication LEDs 25 to 65 of each unit 2 to 6 emit light. Hereinafter, the control operation will be described with reference to FIG. 5 and FIG. 6 in addition to the above drawings. FIG. 5 is a diagram showing the transition of the display color of the state indication LED when there is a notification from the system control unit 2 or a change (event) in the internal state when the units 2 to 6 are in a certain state (or device status), and FIG. 6 is a diagram schematically summarizing the above. Among the events in FIG. 5, the analysis initiation, the analysis stop, and the sleep are based on the notification or the instruction from the system control unit 2, and others are due to changes in the internal state of each unit regardless of the notification or the instruction.

In the LC analysis system of this embodiment, the integrated controller 21 provided in the system control unit 2 sends a control signal to each of the units 3 to 6 via the unit communication IF 23 based on an instruction received from the PC 7 via the PC communication IF 22. In addition, each unit 3 to 6 sends its operation state to the integrated controller 21. Therefore, the integrated controller 21 always grasps the operation state of each unit 3 to 6.

For example, in the liquid supply unit 3, the liquid supply pump 32 sucks the mobile phase from the mobile phase container 31 and sends it to the autosampler unit 4 through the gradient mixer 33, but it takes a little time for the liquid supplying to stabilize after the liquid supply pump 32 initiates to operate. Therefore, it is too late to operate the liquid supply pump 32 at the time of the analysis initiation (sample solution injection), and it is required that the liquid supply pump 32 is operated for a while before the analysis initiation time so that the liquid supplying is stabilized at the time of the analysis initiation. Therefore, the integrated controller 21 sends a control signal to the liquid supply unit 3 to initiate the liquid supplying operation before the instruction of the analysis initiation is given. Upon receipt of this control signal, the local controller 34 of the liquid supply unit 3 makes the liquid supply pump 32 operate. Since the device status is "NotReady" until the liquid supplying by the liquid supply pump 32 is stabilized, the local controller 34 makes the state indication LED 35 light in yellow. Then, when the liquid supply pump 32 becomes in a stable state, the local controller 34 releases "Not Ready" and changes the luminescent color of the state indication LED 35 from yellow to green. At this time, analysis has not been initiated in the liquid supply unit 3, and it is in a state of waiting for the analysis.

In the same manner as in the other units 4 to 6, the local controller (not shown) makes the state indication LEDs 45 to 65 emit light with yellow while the device status at that unit is "NotReady". Then, when it becomes possible to analyze, "NotReady" is released, and the luminescent color of the state indication LEDs 45 to 65 is changed from yellow to green. The integrated controller 21 of the system control unit 2 turns the luminescent color of the state indication LED 25 to green when the operation state at the system control unit 2 becomes analyzable. Therefore, when all the units 2 to 6 including the system control unit 2 become in an analyzable state, all the state indication LEDs 25 to 65 are lit in common green.

When the user instructs the analysis initiation at the input unit 71 or when the analysis initiation is instructed at a preset analysis initiation time in the automatic analysis, the instruction is transmitted from the PC 7 to the integrated controller 21. In response to this, the integrated controller 21 instructs or notifies the analysis initiation to each of the units 3 to 6. For example, in the autosampler unit 4, the local controller receives the instruction of this analysis initiation and makes the suction part 42, etc., operate so as to inject the designated sample solution into the mobile phase. On the other hand, in the liquid supply unit 3, the operation state of the pump main body 37 does not change before and after the analysis initiation, so the local controller 34 does not change the instruction or control to the pump main body 37 even when the instruction of the analysis initiation is received. However, upon receipt of the notification of the analysis initiation, the local controller 34 sets the device status to "RUN", and accordingly changes the luminescent color of the state indication LED 35 from green indicating the state in which the analysis is in a standby mode to blue indicating the state in which the analysis is in operation. This also applies to other units 4 to 6. This also applies to the system control unit 2.

Therefore, if there is no problem in the operation state in all the units 2 to 6 including the unit in which the substantial operation state change does not occur by the initiation of the analysis, the display color of the state indication LED 25 to 65 changes from green to blue. As a result, during the execution of the normal analysis, the display colors of the state indication LEDs 25 to 65 of all the units 2 to 6 become blue, and the user who saw this can intuitively grasp that the LC analysis system is executing the analysis.

When the preset analysis is completed, the integrated controller 21 instructs each unit 3 to 6 to stop the analysis. In response to this, the local controller of each unit 3 to 6 changes the luminescent color of the state indication LED 35 to 65 from blue indicating the state in which the analysis is in progress to green indicating the state in which the analysis is in a standby mode. Also at this time, in the unit in which no substantial change of the operation state occurs due to analysis interruption, if there is no problem in the operation state, the display color of the state indication LED 35 to 65 turns green. This is the same for the system control unit 2, and the display color of the state indication LED 25 turns to green. By the change in the display color of the state indication LED 25 to 65, the user can immediately recognize that the analysis is completed.

On the other hand, in each unit 3 to 6, the local controller detects a state in which there is a possibility that the analysis result may be adversely affected in that unit. The local controller changes the device status from "RUN" to "NotReady" when such a condition is detected. When the device status changes to "NotReady", the local controller changes the luminescent color of the state indication LED 35 to 65 to yellow. In other words, in the state in which analysis is in progress and the state indication LEDs 25 to 65 of all the units 2 to 6 are lit in blue, only in the unit that the use thereof became a non-recommended state, the state indication LED will change to yellow. Therefore, with this display, the user can immediately grasp the unit in which an event which may exert adverse effects on the analysis occurred. This is applied not only during the state in which the analysis is in progress but also during the state in which the state indication LED analysis is in a standby mode. In that case, the state indication LED changes from green to yellow.

In cases where units 2 to 6 are in the device status of "NotReady" described above, although accurate analysis results may not be obtained, it is not a serious malfunction that leads to an equipment breakage. Therefore, it is possible to forcibly initiate the analysis even in the "NotReady" state. However, in that case, as apparent from FIG. 6B, the luminescent colors of the state indication LEDs 25 to 65 remain yellow and will not change to blue. Therefore, in any case, the luminescent color of the state indication LED of the unit whose device status is "NotReady" during the analysis is yellow, and the user can immediately grasp which unit in which the device status is "NotReady" by the luminescent color of the state indication LED.

Also, when the local controller of each unit detects an occurrence of a problem that prevents analysis, the local controller changes the device status to "Error" and notifies of the system control unit 2 of the occurrence of the problem. Since the device status is changed to "Error", the local controller changes the display color of the state indication LED to red. On the other hand, upon receipt of a notification of an occurrence of a problem from a certain unit, the integrated controller 21 also changes the display color of the state indication LED 25 of the unit 2 to red, and controls each of the units 3 to 6 so as to stop the receipt of the analysis initiation when the analysis is in progress. As a result, the user can immediately recognize that the analysis has been canceled due to, e.g., an occurrence of abnormality, and can specify the unit in which the abnormality occurred.

In each unit, the integrated controller 21 and the local controller change the luminescent color of the state indication LED to orange when the device status is "Sleep".

As described above, in the LC system of this embodiment, the display colors of the state indication LEDs 25 to 65 of all the units 2 to 6 are displayed with a common blue color when the analysis is in progress, and when the analysis is completed, the display colors are simultaneously changed to green. Thereby, the user can intuitively grasp that the analysis is in progress, and similarly can intuitively grasp the completion of the analysis as well. Further, the luminescent color of the state indication LED of the unit in which an event that adversely affects the analysis result occurred will change to yellow regardless of whether analysis is in progress or in a standby mode, and therefore the user can grasp at a glance that the event occurred in which unit.

Of course, as shown in FIG. 1, in the LC system of this embodiment, positions and sizes of the state indication LEDs 25 to 65 on the fronts of the housings are matched in the plurality of units 2 to 6, the appearance when all the lights are simultaneously emitted with the same color of blue or green is excellent. Further, it has a sense of unity as a system and is excellent in design.

In the above embodiment, the function of the integrated controller 21 is provided in an independent unit which is the system control unit 2, but the function of the integrated controller 21 may be provided in one of the other units 3 to 6. In that case, the state indication LED connected to the integrated controller 21 in FIG. 3 may be omitted, and the operation of the local controller of each unit 3 to 6 may be performed in the same manner as in the above-described embodiment.

Although the above embodiment is an example in which the present invention is applied to an LC system, the modular-type analysis system according to the present invention can also be applied to various analyzers other than the LC system, such as, e.g., a gas chromatograph, a mass spectrometer, a spectrometer, and a scanning probe microscope.

Further, the above-described embodiment is one example of the present invention, and it is obvious that even if changes, modifications, and additions are appropriately made within the scope of the spirit of the present invention, it is encompassed within the claims of the present invention.

DESCRIPTION OF REFERENCE SYMBOLS

1: analysis main body
2: system control unit
21: integrated controller
22: PC communication interface (IF)
23: unit communication interface (IF)
25, 35, 45, 55, 65: state indication LED
3: liquid supply unit
31: mobile phase container
32: liquid supply pump
33: gradient mixer
34: local controller
4: autosampler unit
41: sample plate
42: suction part
43: injector
5: column oven unit
51: column
6: detector unit
7: PC
71: input unit
72: display unit

The invention claimed is:

1. A modular-type analysis system configured to perform an analysis by combining a plurality of units each having an independent housing, the plurality of units including a system control unit,
the modular-type analysis system comprising:
a) a light emitter provided in a housing of each unit of the plurality of units and configured to emit multicolor lights;
b) an integrated controller provided in the system control unit and configured to control an operation of each unit of the plurality of units to execute the analysis; and
c) a local controller provided in each unit of the plurality of units other than the system control unit,
wherein light with a first color indicating a state in which the analysis is in operation is emitted concurrently from the light emitters in all of the plurality of units in response to a first notification which informs of an initiation of the analysis and is transmitted from the integrated controller to the local controllers as long as an operation state of the plurality of units is normal, wherein the plurality of units include the unit in which the operation state change occurs by the initiation of the analysis and the unit in which the operation state change does not occur by the initiation of the analysis, and
wherein light with a second color indicating a state in which the analysis is in a standby mode is emitted concurrently from the light emitters in all of the plurality of units in response to a second notification which informs of a completion of the analysis and is transmitted from the integrated controller to the local controllers, the second color being different from the first color.

2. The modular-type analysis system as recited in claim 1, wherein the local controller provided in each unit of the plurality of units makes, when an operation state of its unit is abnormal, the light emitter provided in its unit emit light with a predetermined color regardless of the first notification or the second notification.

3. The modular-type analysis system as recited in claim 1, wherein the modular-type analysis system is a liquid chromatograph including at least a liquid supply unit configured to supply a mobile phase, an injector unit configured to inject a sample solution into a supplied mobile phase, a column oven unit configured to control a temperature of a column configured to separate components in the sample solution, and a detector unit configured to detect components in an eluate eluted from the column.

* * * * *